United States Patent [19]

Birkle et al.

[11] Patent Number: 5,109,089
[45] Date of Patent: Apr. 28, 1992

[54] RADIATION-CURABLE LIQUID RESIN FOR SECONDARY COATING OF LIGHTWAVE GUIDES

[75] Inventors: Siegfried Birkle, Hoechstadt A/Aisch; Hans-Dieter Feucht, Erlangen; Rainer Kamps, Coburg; Eva Rissel, Forchheim, all of Fed. Rep. of Germany

[73] Assignee: Siemens Aktiengesellschaft, Berlin & Munich, Fed. Rep. of Germany

[21] Appl. No.: 720,927

[22] Filed: Jun. 25, 1991

Related U.S. Application Data

[62] Division of Ser. No. 286,472, Dec. 19, 1988, Pat. No. 5,057,587.

[30] Foreign Application Priority Data

Dec. 23, 1987 [DE] Fed. Rep. of Germany ....... 3743993

[51] Int. Cl.⁵ ............................................. C08F 24/00
[52] U.S. Cl. ................................. 526/273; 525/528; 525/530; 525/532
[58] Field of Search ................ 526/273; 525/528, 530, 525/532

[56] References Cited

U.S. PATENT DOCUMENTS 4,221,892  9/1980  Baron et al. .................. 525/531
5,057,587 10/1991  Birkle et al. .................. 526/273

*Primary Examiner*—Joseph L. Schofer
*Assistant Examiner*—Alex H. Walker
*Attorney, Agent, or Firm*—Kenyon & Kenyon

[57] ABSTRACT

The invention provides a radiation-curable liquid resin useful as a secondary coating of lightwave guides. The resin is a reaction product of (meth)acrylic acid or glyceroldi(meth)acrylate or pentaerythritoltri(meth)acrylate with a 2:1 addition compound of a diepoxide and an $\alpha,\omega$-diol with a mean molecular weight between 600 and 3000, or, a reaction product of (meth)acrylic acid or -acid chloride or isocyanatoalkyl-(meth)acrylate with a conversion product of the 2:1 addition compound and a low-molecular monovalent alcohol $C_1$ to $C_{10}$), a low-molecular bivalent alcohol ($C_2$ to $C_4$) or water, where the diepoxide is an aromatic diglycidylether and the $\alpha,\omega$-diol is an $\alpha,\omega$-hydroxy-terminated polyoxyalkylene, an $\alpha,\omega$-hydroxy-terminated polyester, an $\alpha,\omega$-hydroxy-terminated polybutadiene or an $\alpha,\omega$-hydroxy-terminated organo-functional polysiloxane.

8 Claims, No Drawings

RADIATION-CURABLE LIQUID RESIN FOR SECONDARY COATING OF LIGHTWAVE GUIDES

This is a division of application Ser. No. 07/286,472 filed Dec. 19, 1988, now U.S. Pat. No. 5057587.

BACKGROUND OF THE INVENTION

The invention relates to a radiation-curable liquid resin for secondary coating of lightwave guides. The invention further relates to secondary coatings prepared from the liquid resin, and lightwave guides having such secondary coatings.

Typically, lightwave guides have two coatings: a soft primary coating and a hard secondary coating. Currently, primary coatings are predominantly radiation-cured urethane acrylates. Radiation-cured epoxyacrylates or urethane acrylates are predominantly used as secondary coatings. (See, for example: "Polym. Mater. Sci. Eng."Vol. 55, 1986, pages 36 to 539). Resins used as coatings must be radiation-curable so as to permit rapid and cost-effective curing. Such resins must also be liquid so that it is possible to process them essentially solvent-free in order to be able to meet environmental protection requirements.

The epoxy and urethane acrylates currently used as secondary coatings have a sufficiently high glass transition range ($T_g \geq +60°$ C). Moreover, they are compatible with primary coatings based on urethane acrylate. However, in the manufacture of the coating, it is also important that the corresponding liquid resins have high radiation sensitivity in order to permit high curing rates.

"Chemical Abstracts" Vol. 106 (1987), page 7, No. 161368y, for example, discloses a coating material for optical glass fibers. The coating material is based on polyoxyalkylene and can function for manufacturing secondary coatings. This coating material contains oligomers which are obtained through the conversion of hydroxy-terminated aliphatic linear compounds such as polypropylene glycol, with diisocyanates and tris-hydroxyalkylisocyanurate-di(meth)-acrylates. Such resins do have more than two radiation-curable groups per molecule so that they should have a high curing rate. However, coupling on radiation-curable groups via bisurethane structures (by using diisocyanates) results in resins having a high viscosity. It is, therefore, required to add large quantities of reactive thinners to the known resins in order to be able to apply them as coating materials. This extra step entails additional costs and is also accompanied by other disadvantages such as high vapor pressure of the reactive thinners.

Accordingly, it is an object of the invention to provide a radiation-curable liquid resin which is suitable for the manufacture of secondary coatings of lightwave guides which have a glass transition range $\geq +60°$ C.

It is further object of the invention to provide a liquid resin having a high radiation-sensitivity and high curing rate.

It is a further object of the invention to provide a radiation-curable liquid resin having a viscosity which, at most, requires the addition of relatively small quantities of thinning agents when applied as a secondary coating.

It is a further object of the invention to provide secondary coatings which are compatible with the primary coatings (particularly primary coatings base on urethane acrylates) of lightwave guides.

SUMMARY OF THE INVENTION

The invention provides a resin which is a reaction product of (meth)acrylic acid or glycerol di(meth)-acrylate or pentaerythritoltri(meth)acrylate with a 2:1 addition compound of a diepoxide and an $\alpha, \omega$-diol with a mean molecular weight between 600 and 3000, or a reaction product of (meth)acrylic acid or -acid chloride or isocyanatoalkyl(meth)-acrylate with a conversion product of the 2:1 addition compound and a low-molecular monovalent alcohol ($C_1$ to $C_{10}$), a low-molecular bivalent alcohol ($C_2$ to $C_4$) or water, where the diepoxide is an aromatic diglycidylether and the $\alpha, \omega$-diol is an $\alpha, \omega$-hydroxy-terminated polyoxyalkylene, an $\alpha, \omega$-hydroxy-terminated polyester, an $\alpha, \omega$-hydroxy-terminated polybutadiene or an $\alpha, \omega$-hydroxy-terminated organo-functional polysiloxane.

DETAILED DESCRIPTION OF THE INVENTION

The diepoxide (i.e., the aromatic diglycidylether) of the addition compound used in the manufacture of the resin of the invention is preferably bisphenol A- or bisphenol F-diglycidylether. As the $\alpha, \omega$-diols of the addition compound, the following compounds are preferred:

- polytetrahydrofuran, polypropylene glycol, or an ethyleneoxide-tetrahydrofuran copolymer (as $\alpha, \omega$-hydroxy-terminated polyoxyalkylene);
- polycaprolactonediol (as $\alpha, \omega$-hydroxy-terminated polyester);
- linear polydimethylsiloxane with terminal primary hydroxyalkyl groups (as $\alpha, \omega$-hydroxy-terminated organo-functional polysiloxane).

The 2:1 addition compounds which are formed through the conversion of the diepoxides (Formula I) with the $\alpha, \omega$-diols (Formula II) have a structure corresponding to the general Formula III

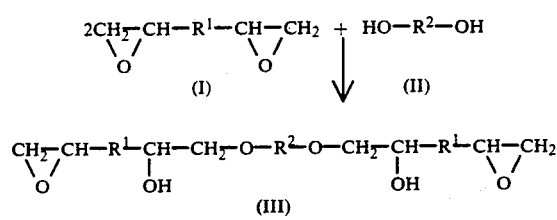

In the manufacture of the 2:1 addition compounds, the diepoxide and the diol are allowed to react with each other in a low-boiling point organic solvent (such as trichloromethane) at an increased temperature ($<80°$ C.) in the presence of an acidic catalyst (such as trifluoromethanesulfonic acid). The ratio of the starting components diepoxide and diol is approximately 2:1.

The terminal epoxide groups of the 2:1 addition compounds are then opened when the addition compounds are subjected to one of the following reactions (a) or (b):

(a) conversion either with (meth)acrylic acid or with glyceroldi(meth)acrylate or pentaerythritoltri(-meth)acrylate, for example

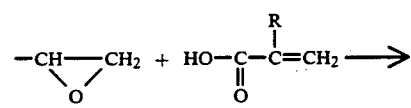

-continued

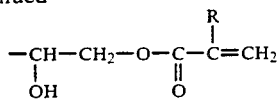

from III  R = H, CH₃

(b) conversion either with water with a monovalent alcohol or with a bivalent alcohol:

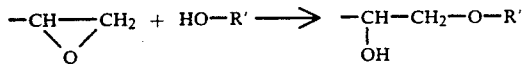

from III   R' = H, Alkyl, R''—OH (R'' = alkylene).

In reaction (a) ring opening takes place and, simultaneously, radiation-curable groups are introduced. However, in reaction (b) the epoxide ring only is opened. Therefore, in the latter case, the conversion product is additionally allowed to react with (meth)acrylic acid or -acid chloride or with isocyanatoalkyl- (meth)acrylate, wherein the radiation-curable groups are coupled on.

The radiation-curable liquid resins according to the invention have a viscosity which makes them suitable for the manufacture of secondary coatings. Furthermore, these resins are highly sensitive to radiation (i.e., UV radiation) so that high curing rates result from their use. These resins may contain up to eight radiation-curable groups per molecule. But even in the extreme case, the requisite flexibility is still ensured because the diol forming the base of the resins has a relatively high mean molecular weight (specifically a molecular weight between 600 and 3000).

The secondary coatings manufactured from the radiation-curable liquid resins according to the invention have a glass transition range > +60° C. Furthermore, these secondary coatings have polar groups and, hence, are compatible with primary coatings based on, inter alia, urethane acrylates. The secondary coatings according to the invention show particularly good compatibility with the primary coatings which are described in the German Patent Applications File P 37 43 990.1 "Radiation-curable liquid resin for primary coating of lightwave guides" and File P 37 43 873.5 "Radiation-curable liquid resin for coating lightwave guides".

In conjunction with the following embodiment examples the invention will be explained in greater detail.

EXAMPLE 1

100 g of a commercially available polytetrahydrofuran with a mean molecular weight of 2000 ($\triangleq$ 0.1 mole —OH) and 300 g dry trichloromethane, stabilized with 2-methyl-butene-2, are placed into a 1 flask (with stirrer, internal thermometer, dripping funnel and reflex cooler with drying tube). After adding approximately 1 ml trifluoromethanesulfonic acid as a catalyst, the mixture is heated to approximately 60° C. Subsequently, 34 g bisphenol A-diglycidylether ($\triangleq$ 0.2 mole epoxide) dissolved in 100 g dry trichloromethane, are added dropwise over a period of one hour while the mixture is stirred. The reaction mixture is subsequently stirred at 60° C. until approximately 50% of the epoxide groups are converted. Next, a quantity of ethylene glycol equimolar with the residual epoxide groups (one mole ethyleneglycol for each free epoxide group) is added, and the reaction mixture stirred at 60° C. until no more epoxide can be demonstrated. After cooling, 10 g of cross-linked poly(4-vinyl-pyridine) are added and the mixture is stirred for 6 hours at room temperature. Subsequently, suctioning takes place and then pressure filtering through a 0.8 μm membrane filter. The solvent is subsequently removed in vacuo at a bath temperature of approximately 80° C. Approximately 125 g of a 2:1 addition compound of the diepoxide and the α, ω-diol are obtained in the form of a clear, slightly yellow, highly viscous oil (OH value: 0.173 mole/100 g).

100 g of the 2:1 addition compound obtained in the above described manner, dissolved in 100 g dry trichloromethane, are placed into a 500 ml three-neck flask (with internal thermometer, dripping funnel, drying tube, and a magnetic stirring rod). After adding approximately 0.5 ml of a dibutyltin dilaurate solution (10 g in 100 ml CHCl₃) as a catalyst, 26.8 g isocyanatoethylmethacrylate ($\triangleq$ 0.173 mole —NCO), dissolved in 50 g dry trichloromethane, are added dropwise over a period of an hour at room temperature while the mixture is being stirred. During this time the reaction temperature should not exceed 30° C. The reaction mixture is subsequently stirred at room temperature until no more isocyanate is demonstrable. Subsequently, the solvent is removed in vacuo at a bath temperature of 40° C. Approximately 120 g of a clear, slightly yellow, resin with a viscosity of approximately 58000 mPa.s (at 23° C.) are obtained.

A layer of the resin which is approximately 500 μm thick is cured by electron beams under nitrogen (acceleration voltage: 1 MeV; dose: 25 kGy). Clear, hard films are obtained which have a glass transition temperature of 82° C.

From a sample of the resin which contains 3% by mass of a photoinitiator based on hydroxypropiophenone, films are cast which are approximately 500 μm thick. The films are completely cured within 30 seconds by means of UV radiation radiator with a radiation intensity of 3 mW/cm²). The cured films are clear and hard and they have a glass transition temperature of 80° C.

These films, as well as the films of the above cited type, are suitable as secondary coatings for lightwave guides.

EXAMPLE 2

In accordance with Example 1, 65 g of a commercially available polytetrahydrofuran with a mean molecular weight of 650 ($\triangleq$ 0.2 mole —OH), dissolved in 300 g dry trichloromethane, are allowed to react, in the presence of approximately 1 ml trifluoromethane-sulfonic acid, with 68 g bisphenol A-diglycidylether ($\triangleq$ 0.4 mole epoxide), dissolved in 100 g dry trichloromethane. The reaction mixture is then treated further in accordance with Example 1 and processed Approximately 120 g of a 2:1 addition compound of the diepoxide and the α, ω-diol are obtained in the form of a clear, slightly yellow, highly viscous oil (OH value: 0.33 mole/100 g).

In accordance with Example 1, 100 g of the 2:1 addition compound obtained in the above described manner, dissolved in 100 g dry trichloromethane, are allowed to react, in the presence of approximately 0.5 ml of a dibutyltindilaurate solution, with 51.2 g isocyanatoethylmethacrylate ($\triangleq$ 0.33 mole —NCO), dissolved in 50 g dry trichloromethane. The reaction mixture is then treated further in accordance with Example 1 and processed. Approximately 145 g of a clear, slightly yellow, highly viscous resin with a viscosity of approximately 62000 mPa.s (at 23° C.) are obtained.

A layer of the resin which is approximately 500 μm thick is cured by electron beams under nitrogen (acceleration voltage: 1 MeV; dose: 25 kGy). Clear, hard films are obtained which have a glass transition temperature of 80° C. The films are, hence, suitable as secondary coatings for lightwave guides.

EXAMPLES 3

In accordance with Example 1, 100 g of a commercially available ethyleneoxide-tetrahydrofuran-copolyetherglycol with a mean molecular weight of 2 000 ($\triangleq$ 0.1 mole —OH), dissolved in 300 g dry trichloromethane, are allowed to react, in the presence of approximately 1 ml trifluoromethanesulfonic acid, with 34 g bisphenol A-diglycidylether ($\triangleq$ 0.2 mole epoxide), dissolved in 100 g dry trichloromethane. The reaction mixture is subsequently further treated in accordance with Example 1 and processed. Approximately 115 g of a 2:1 addition compound of the diepoxide and the $\alpha$, $\omega$diol are obtained in the form of a clear, slightly yellow, oil (OH value: 0.158 mole/100 g).

In accordance with Example 1, 100 g of the 2:1 addition compound obtained in the above described manner, dissolved in 100 g dry trichloromethane, are allowed to react, in the presence of approximately 0.5 ml of a dibutyltindilaurate solution, with 24.5 g isocyanatoethyl-methacrylate ($\triangleq$ 0.158 mole —NCO), dissolved in 50 g dry trichloromethane. The reaction mixture is subsequently treated further in accordance with Example 1 and processed. Approximately 120 g of a clear slightly yellow, resin with a viscosity of approximately 30500 mPa.s (at 23° C.) are obtained.

A layer of the resin which is approximately 500 μm thick is cured under nitrogen by electron beams (acceleration voltage: 1 MeV; dose: 25 kGy). Clear, relatively hard films are obtained which have a glass transition temperature of 60° C. The films, hence, are suitable as secondary coatings for lightwave guides.

EXAMPLE 4

In accordance with Example 1, 217 g of a linear polydimethylsiloxane, commercially available under the name Baysilon 502 (Baysilon ® is a trade-mark of Bayer AG), with terminal primary hydroxyalkyl groups ($\triangleq$ 0.4 mole —OH), dissolved in 200 g dry trichloromethane, are allowed to react, in the presence of approximately 0.5 ml trifluoromethanesulfonic acid, with 136 g bisphenol A-diglycidylether ($\triangleq$ 0.8 mole epoxide), dissolved in 350 g dry trichloromethane. The reaction mixture is stirred at 60° C. until approximately 50% of the epoxide groups are converted. The residual epoxide groups are allowed to react with 60 g butanediol (3-fold excess). Subsequently, the reaction mixture is extracted 5 times with 400 ml water, dried with sodium sulfate, and pressure filtered through a 0.8 μm membrane filter. The solvent is subsequently removed in vacuo at a bath temperature of approximately 60° C. Approximately 255 g of a 2:1 addition product of the diepoxide and the $\alpha$, $\omega$-hydroxy-terminated organo-functional polysiloxane are obtained in the form of a clear, colorless viscous oil (OH value: 0.227 mole/100 g).

120 g of the 2:1 addition product obtained in the above described manner, dissolved in 150 g dry dichloromethane, are allowed to react, in the presence of approximately 0.5 ml of dibutyltincilaurate solution, in accordance with Example 1, over a period of 90 min with 42.4 g isocyanatoethyl-methacrylate ($\triangleq$ 0.272 mole —NCO), dissolved in 90 g dry trichloromethane. The reaction mixture is subsequently treated further in accordance with Example 1 and processed, with the solvent being removed in vacuo at a bath temperature of approximately 30° C. Approximately 150 g of a clear, slightly yellow, viscous resin with a viscosity of approximately 35000 mPa.s (at 23° C.) are obtained.

From a sample of the resin approximately 500 μm thick films are cast and completely cured by electron beams under nitrogen (acceleration voltage: 1 MeV; dose: 25 kGy). Films with a glass transition temperature of 86° C. and an E-modulus of 270 N/mm$^2$ are obtained. The films are therefore suitable as secondary coatings for lightwave guides.

What is claimed is:

1. A secondary coating for lightwave guides comprising at least one radiation cured radiation-curable liquid resin, said radiation-curable resin comprising a reaction product selected from the group consisting of an adduct (a) of glyceroldi(meth)acrylate or pentaerythritoltri(-meth)acrylate with a 2:1 addition compound of a diepoxide and an $\alpha$, $\omega$-diol with a mean molecular weight between 600 and 3000, and an adduct (b) of (meth)acrylic acid or -acid chloride or isocyanatoalkyl-(meth)acrylate with a conversion product of the 2:1 addition compound and a low-molecular monovalent alcohol ($C_1$ to $C_{10}$) or a low-molecular bivalent alcohol ($C_2$ to $C_4$) or water, where the diepoxide is an aromatic diglycidylether and the $\alpha$, $\omega$-diol is an $\alpha$, $\omega$-hydroxy-terminated polyoxyalkylene, an $\alpha$, $\omega$-hydroxy-terminated polyester, an $\alpha$, $\omega$-hydroxy-terminated polybutadiene, or an $\alpha$, $\omega$-hydroxy-terminated organo-functional polysiloxane.

2. The secondary coating according to claim 1 wherein the diepoxide of the radiation-curable resin is bisphenol A- or bisphenol F- diglycidylether.

3. The secondary coating according to claim 1 wherein the $\alpha$, $\omega$-diol of the radiation-curable resin is polytetrahydrofuran, polypropyleneglycol, an ethyleneoxide-tetrahydrofuran copolymer, polycaprolactonediol or a linear polydimethyl-siloxane with terminal primary hydroxyalkyl groups.

4. The secondary coating according to claim 2 wherein the $\alpha$, $\omega$-diol of the radiation-curable resin is polytetrahydrofuran, polypropyleneglycol, an ethylenoxide-tetrahydrofuran copolymer, polycaprolactonediol or a linear polydimethyl-siloxane with terminal primary hydroxyalkyl groups.

5. A lightwave guide having a secondary coating according to claim 1.

6. A lightwave guide having a secondary coating according to claim 2.

7. A lightwave guide having a secondary coating according to claim 3.

8. A lightwave guide having a secondary coating according to claim 4.

* * * * *